(12) United States Patent
Gumpoltsberger et al.

(10) Patent No.: US 8,485,934 B2
(45) Date of Patent: Jul. 16, 2013

(54) MULTI-RATIO TRANSMISSION

(75) Inventors: Gerhard Gumpoltsberger, Friedrichshafen (DE); Christian Sibla, Friedrichshafen (DE); Stefan Beck, Eriskirch (DE); Josef Haupt, Tettnang (DE); Gert Bauknecht, Friedrichshafen (DE); Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 23 days.

(21) Appl. No.: 13/391,036

(22) PCT Filed: Aug. 11, 2010

(86) PCT No.: PCT/EP2010/061669
§ 371 (c)(1),
(2), (4) Date: Feb. 17, 2012

(87) PCT Pub. No.: WO2011/020750
PCT Pub. Date: Feb. 24, 2011

(65) Prior Publication Data
US 2012/0149525 A1    Jun. 14, 2012

(30) Foreign Application Priority Data
Aug. 20, 2009  (DE) .......................... 10 2009 028 669

(51) Int. Cl.
*F16H 3/62* (2006.01)
(52) U.S. Cl.
USPC ........................................................ 475/275
(58) Field of Classification Search
None
See application file for complete search history.

(56) References Cited

U.S. PATENT DOCUMENTS

| | | | |
|---|---|---|---|
| 4,070,927 A * | 1/1978 | Polak | 475/286 |
| 4,395,925 A | 8/1983 | Gaus | |
| 4,683,776 A * | 8/1987 | Klemen | 475/286 |
| 6,176,803 B1* | 1/2001 | Meyer et al. | 475/286 |
| 6,558,287 B2 | 5/2003 | Hayabuchi et al. | |
| 7,226,381 B2* | 6/2007 | Klemen | 475/275 |
| 7,341,537 B2 | 3/2008 | Klemen | |
| 7,364,527 B2* | 4/2008 | Klemen | 475/290 |
| 7,549,942 B2 | 6/2009 | Gumpoltsberger | |
| 7,753,820 B2* | 7/2010 | Phillips et al. | 475/276 |
| 7,887,453 B2* | 2/2011 | Phillips et al. | 475/275 |
| 2009/0017971 A1 | 1/2009 | Phillips et al. | |

(Continued)

FOREIGN PATENT DOCUMENTS

| | | |
|---|---|---|
| DE | 29 36 969 A2 | 4/1981 |
| DE | 199 49 507 A1 | 4/2001 |

(Continued)

OTHER PUBLICATIONS

Gumpoltsberger, Gerhard: Systematic Synthesis and Evaluation of Multi-Stage Planetary Transmissions, Dissertation TU Chemnitz, 2007, pp. 1-210.

(Continued)

*Primary Examiner* — Dirk Wright
(74) *Attorney, Agent, or Firm* — Davis & Bujold, PLLC

(57) ABSTRACT

A multi-ratio transmission comprising four planetary gearsets, eight rotary shafts and six shifting elements including first, second, third and fourth clutches and first and second brakes. The shafts either directly couple or selectively couple, via the shifting elements, the gearsets to each other or a housing of the transmission so as to implement nine forward gears and one reverse gear.

6 Claims, 2 Drawing Sheets

U.S. PATENT DOCUMENTS

2009/0197733 A1    8/2009    Phillips et al.
2011/0009228 A1    1/2011    Bauknecht et al.
2012/0053008 A1*    3/2012    Beck et al. .................... 475/276

FOREIGN PATENT DOCUMENTS

| | | |
|---|---|---|
| DE | 100 83 202 T2 | 1/2002 |
| DE | 102 13 820 A1 | 10/2002 |
| DE | 10 2005 010 210 A1 | 9/2006 |
| DE | 10 2006 009 748 A1 | 10/2006 |
| DE | 10 2006 024 442 A1 | 11/2006 |
| DE | 10 2006 044 882 A1 | 4/2007 |
| DE | 10 2006 006 637 A1 | 9/2007 |
| DE | 10 2008 000 428 A1 | 9/2009 |
| EP | 0 239 205 A2 | 9/1987 |

OTHER PUBLICATIONS

Gumpoltsberger, Gerhard: Synthesis of Planetary Transmissions, ZF Friedrichshafen AG, 2009, 13 pages, Germany.

* cited by examiner

| | 03 | 04 | 13 | 16 | 48 | 67 | i | phi |
|---|---|---|---|---|---|---|---|---|
| 1. GEAR | X | | | X | X | | 4.864 | 1.490 |
| 2. GEAR | X | X | | X | | | 3.265 | 1.497 |
| 3. GEAR | X | | | X | | X | 2.181 | 1.414 |
| 4. GEAR | | X | | X | | X | 1.542 | 1.194 |
| 5. GEAR | | | | X | X | X | 1.292 | 1.292 |
| 6. GEAR | | | X | X | | X | 1.000 | 1.181 |
| 7. GEAR | | | X | X | X | | 0.847 | 1.308 |
| 8. GEAR | | | X | | X | X | 0.647 | 1.196 |
| 9. GEAR | | X | X | | | X | 0.541 | 8.993 |
| R GEAR | X | | | | X | X | -3.298 | -0.678 |

Fig. 3

MULTI-RATIO TRANSMISSION

This application is a national stage completion of PCT/EP2010/061669 filed Aug. 11, 2010 which claims priority from German Application Serial No. 10 2009 028 669.1 filed Aug. 20, 2009.

FIELD OF THE INVENTION

The present invention concerns a multi-ratio transmission of planetary structure, in particular an automatic transmission for a motor vehicle.

BACKGROUND OF THE INVENTION

According to the prior art automatic transmissions, in particular for motor vehicles, comprise planetary gearsets which are shifted by means of frictional shifting elements such as clutches and brakes, and usually a starting element that can operate with slip and is optionally provided with a bridging clutch, such as a hydrodynamic torque converter or a hydraulic coupling.

Such an automatic transmission is known for example from DE 199 49 507 A1 by the present applicant; in this case two non-shiftable twin-range gearsets are provided on the drive input shaft, which on the output side produce two rotational speeds which, besides the speed of the driveshaft, can be optionally engaged with a shiftable double planetary gearset that acts on the drive output shaft by the selective engagement of the shifting elements used, in such manner that to shift from a gear to the respective next higher or next lower gear, of the two shifting elements actuated at the time, in each case, only one shifting element has to be engaged or disengaged.

In this case, if five shifting elements are used, seven forward gears can be obtained and if six shifting elements are used, nine or ten forward gears can be obtained.

Furthermore, from DE 102 13 820 A1 a multi-gear automatic transmission with eight forward gears and one reverse gear is known, which comprises a first input pathway T1 of a first gear ratio; an input pathway T2 which has a higher gear ratio than the input pathway T1; a planetary gearset of the Ravigneaux type with four elements, these four elements being a first element, a second element, a third element and a fourth element in the sequence of the elements in a rotational speed diagram; a clutch C-2 which transmits rotation of the input pathway T2 to the first element S3; a clutch C-1 which transmits rotation of the input pathway T2 to the fourth element S2; a clutch C-4 that transmits rotation of the input pathway T1 to the first element; a clutch C-3 that transmits rotation from the input pathway T1 to the second element C3; a brake B-1 which engages the fourth element; a brake B-2 which engages the second element; and an output element which is coupled to the third element S3.

In addition a 9-gear multi-speed transmission is known from DE 29 36 969 A1; this comprises eight shifting elements and four gearsets, one gearset serving as an intermediate transmission and the main transmission comprising a Simpson gearset and a further gearset that serves as a reversing transmission.

Further multi-speed transmissions are known, for example from DE 10 2005 010 210 A1 and DE 10 2006 006 637 B1 by the present applicant.

Automatically shiftable vehicle transmission of planetary design in general have often already been described in the prior art and are continually undergoing further development and improvement. Ideally, such transmissions should entail little structural complexity, in particular requiring a small number of shifting elements, and should avoid double shifts during sequential shifting operations so that during shifts in defined gear groups, in each case only one shifting element is changed.

From the not yet published DE 102008000428.3 by the present applicant a multi-speed transmission of planetary design is known, which comprises a drive input and a drive output arranged in a housing. In this known transmission there are provided at least four planetary gearsets, referred to below as the first, second, third and fourth planetary gearsets, at least eight rotary shafts—referred to as the input shaft, the output shaft and the third, fourth, fifth, sixth, seventh and eight shafts—and at least six shifting elements, including brakes and clutches, whose selective engagement produces various gear ratios between the drive input and the drive output so that, preferably, nine forward gears and one reverse gear can be obtained.

In this case the first and second planetary gearsets, which are preferably designed as minus planetary gearsets, form a shiftable intermediate gearset whereas the third and fourth planetary gearsets form a main gearset.

In this known multi-speed transmission it is provided that the carriers of the first and second planetary gearsets are coupled with one another by the fourth shaft, which is connected to an element of the main gearset, the ring gear of the first planetary gearset is coupled with the sun gear of the second planetary gearset by the eighth shaft, which can be releasably connected by a first clutch to the drive output shaft, and the sun gear of the first planetary gearset can be coupled to the housing of the transmission by means of the third shaft via a first brake, and can be releasably connected to the drive input shaft by a second clutch, whereas the ring gear of the second planetary gearset can be coupled with the housing of the transmission by means of the fifth shaft via a second brake. Furthermore, the seventh shaft is permanently connected to an element of the main gearset and can be coupled to the housing of the transmission by a third brake, while the sixth shaft is permanently connected to at least one other element of the main gearset and can be releasably connected to the drive input shaft by means of a third clutch; the drive output shaft is permanently connected to at least one further element of the main gearset.

Preferably, in the known transmission the fourth shaft is permanently connected to the ring gear of the third planetary gearset, whereas the sixth shaft is permanently connected to the ring gear of the fourth planetary gearset and to the carrier of the third planetary gearset, and can be releasably connected to the drive input shaft by the third clutch. In addition the seventh shaft is permanently connected to the sun gears of the third and fourth planetary gearsets and can be coupled with the housing of the transmission by the third brake. In this case the drive output takes place by way of the output shaft permanently connected to the carrier of the fourth planetary gearset. In addition the third and fourth planetary gearsets can be combined or reduced to a Ravigneaux gearset with a common carrier and a common ring gear.

SUMMARY OF THE INVENTION

The purpose of the present invention is to propose a multi-speed transmission of the type described at the start, which provides nine forward gears and at least one reverse gear with a sufficient gear ratio, with which the structural complexity and size, in particular the overall length and weight are optimized, and in addition the efficiency in relation to drag and gear-tooth losses is improved. Furthermore, in the multi-speed transmission according to the invention low supporting torques should act upon the shifting elements. In particular, the transmission according to the invention should be suitable for mounting in a front, transverse position.

Thus, according to the invention a multi-speed transmission of planetary structure is proposed, which comprises a drive input and a drive output arranged in a housing. In addition there are provided at least four planetary gearsets, referred to below as the first, second, third and fourth planetary gearsets, eight rotary shafts—referred to below as the input shaft, the output shaft and the third, fourth, fifth, sixth, seventh and eighth shafts, and at least six shifting elements, including brakes and clutches, whose selective engagement produces various gear ratios between the drive input and the drive output, so that preferably nine forward gears and one reverse gear can be obtained.

As viewed axially, the planetary gearsets are arranged in the sequence first planetary gearset, second planetary gearset, third planetary gearset and fourth planetary gearset, and are preferably designed as minus planetary gearsets.

As is known, a simple minus planetary gearset comprises a sun gear, a ring gear and a carrier on which planetary gearwheels are mounted and can rotate, these meshing in each case with the sun gear and the ring gear. Due to this, when the carrier is immobilized the ring gear rotates in the opposite direction of the sun gear. In contrast, a simple plus planetary gearset comprises a sun gear, a ring gear, and a carrier on which are mounted inner and outer planetary gearwheels, such that all the inner planetary gears mesh with the sun gear and all the outer planetary gears mesh with the ring gear, while each inner planetary gear meshes with a respective outer planetary gear. Consequently, when the carrier is immobilized the ring gear rotates in the same direction as the sun gear.

According to the invention the sun gear of the first planetary gearset is functionally connected to the drive input shaft, which can be releasably connected by a first clutch to the third shaft and by a second clutch to the sixth shaft, the third shaft is connected to the carrier of the second planetary gearset and to the ring gear of the third planetary gearset and can be coupled by a first brake to a housing of the transmission, the fourth shaft can be coupled by a second brake with the housing of the transmission, is connected to the ring gear of the second planetary gearset, and is functionally connected to the carrier of the first planetary gearset, and the sixth shaft is connected to the sun gear of the fourth planetary gearset and can be releasably connected by a third clutch to the seventh shaft, which is connected to the sun gear of the third planetary gearset and to the sun gear of the second planetary gearset.

Furthermore, the ring gear of the first planetary gearset is connected in a rotationally fixed manner to the housing of the transmission, the fifth shaft is connected to the carrier of the third planetary gearset and to the ring gear of the fourth planetary gearset, and the drive output shaft is connected to the carrier of the fourth planetary gearset.

Preferably, the sun gear of the first planetary gearset is connected directly to the drive input shaft, whereas the carrier of the first planetary gearset can be releasably connected to the ring gear of the second planetary gearset by way of an eighth shaft connected to the carrier of the first planetary gearset, a fourth clutch which releasably connects the eighth shaft to the fourth shaft, and the fourth shaft connected to the ring gear of the second planetary gearset.

In one variant of the invention, the drive input shaft can be releasably connected to the sun gear of the first planetary gearset not directly, but by way of a further shaft connected to the sun gear of the first planetary gearset and a further clutch that releasably connects the input shaft to the further shaft, and in this case the carrier of the first planetary gearset is connected directly by the fourth shaft to the ring gear of the second planetary gearset.

By virtue of the design of the multi-speed transmission according to the invention suitable gear ratios are obtained, in particular for passenger cars, along with a greater overall ratio spread of the multi-speed transmission, whereby the driving comfort is improved and the fuel consumption is reduced significantly.

Moreover, with the multi-speed transmission according to the invention the small number of shifting elements reduces the structural cost and complexity considerably. Advantageously, with the multi-speed transmission according to the invention starting can be carried out with a hydrodynamic converter, an external starting clutch or even with other suitable external starting elements. It is also conceivable to enable a starting process with a starting element integrated in the transmission. It is preferable to use a shifting element that is actuated in the first forward gear and in the reverse gear.

Furthermore, with the multi-speed transmission according to the invention good efficiency is obtained in the main driving gears in relation to drag and gear-tooth losses.

Moreover the torques in the shifting elements and the planetary gearset of the multi-speed transmission are low, and this advantageously reduces the wear in the multi-speed transmission. In addition the low torques enable the dimensions chosen to be correspondingly small, so that the space needed and the corresponding costs are reduced. Furthermore, the rotational speeds of the shafts and in the shifting elements and planetary gearsets are also low.

In addition the transmission according to the invention is designed so that it can be adapted to various drive-train configurations, both in the force flow direction and also with regard to the space it occupies.

BRIEF DESCRIPTION OF THE DRAWINGS

Below, an example of the invention is explained in more detail with reference to the attached figures, which show:

FIG. 3: An example of a shifting scheme for a multi-speed transmission according to FIG. 1.

DETAILED DESCRIPTION OF THE DRAWINGS

Figure 1:
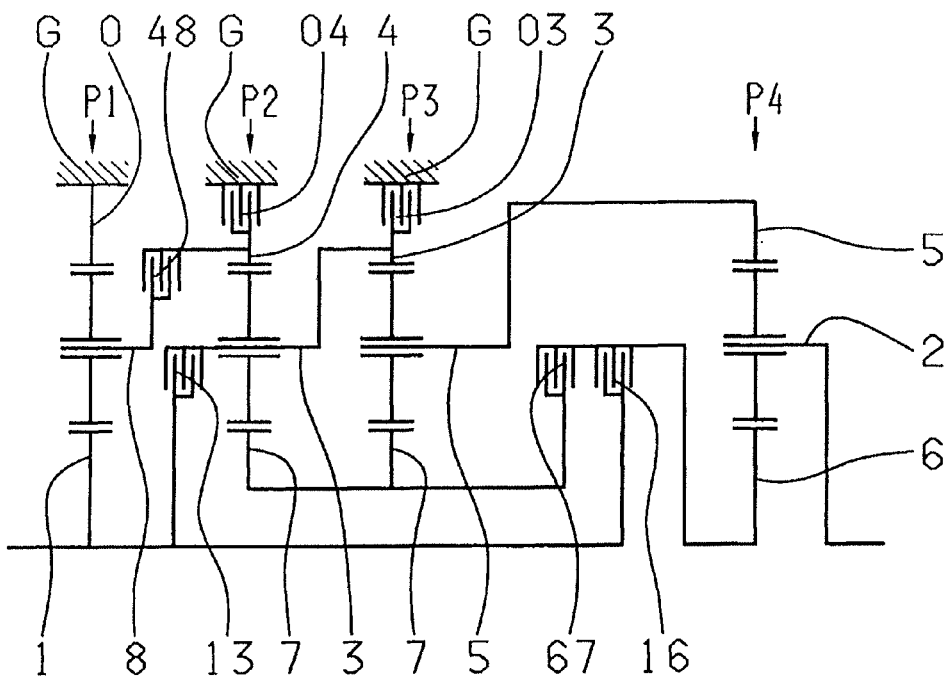
FIG. 1: A schematic view of a first preferred embodiment of a multi-speed transmission according to the invention.

FIG. 1 shows a multi-speed transmission according to the invention with a drive input shaft 1, a drive output shaft 2 and four planetary gearsets P1, P2, P3 and P4, which are arranged in a housing G. In the example shown in FIG. 1 the planetary gearsets P1, P2, P3 and P4 are designed as minus planetary gearsets. According to the invention, at least one planetary gearset can alternatively be made as a plus planetary gearset if at the same time the carrier and ring gear connections are exchanged and the value of the fixed gear ratio is increased by 1.

In the example embodiment shown, as viewed axially the planetary gearsets are arranged in the sequence P1, P2, P3, P4.

As can be seen in FIG. 1, six shifting elements are provided, namely two brakes 03, 04 and four clutches 13, 16, 48 and 67. The shifting elements can be positioned in any spatial arrangement, restricted only by dimensions and external shape. The clutches and brakes of the transmission are preferably in the form of frictional shifting elements or disk shifting elements.

With these shifting elements nine forward gears and one reverse gear can be engaged selectively. The multi-speed transmission of FIG. 1 has a total of eight rotary shafts, namely the shafts 1, 2, 3, 4, 5, 6, 7 and 8, the drive input shaft being the first of these and the drive output shaft the second.

In the embodiment shown in FIG. 1 the sun gear of the first planetary gearset P1 is connected directly to the drive input shaft 1, which can be releasably connected by a first clutch 13 to the third shaft 3 and by a second clutch 16 to the sixth shaft 6; in this case the third shaft 3 is connected to the carrier of the second planetary gearset P2 and to the ring gear of the third planetary gearset P3, and can be coupled with a housing G of the transmission by a first brake 03. Furthermore, the sixth shaft 6 is connected to the sun gear of the fourth planetary gearset P4 and can be releasably connected to the seventh shaft 7 by a third clutch 67, the seventh shaft 7 being connected to the sun gear of the third planetary gearset P3 and to the sun gear of the second planetary gearset P2.

As can be seen from FIG. 1, the carrier of the first planetary gearset P1 can be releasably connected by way of the eighth shaft 8 and a fourth clutch 48 to the fourth shaft 4, which is connected to the ring gear of the second planetary gearset P2 and can be coupled with a housing G of the transmission by a second brake 04. Furthermore, the ring gear of the first planetary gearset P1 is connected in a rotationally fixed manner by a shaft 0 to a housing G of the transmission, whereas the fifth shaft 5 is connected to the carrier of the third planetary gearset P3 and to the ring gear of the fourth planetary gearset P4, and the drive output shaft 2 is connected to the carrier of the fourth planetary gearset P4.

According to the invention, as viewed axially the second and third clutches 16 and 67 can be arranged between the third and fourth planetary gearsets P3, P4 and can have a common outer disk carrier, whereas as viewed axially the first and fourth clutches 13, 48 can be arranged between the first and second planetary gearsets P1, P2.

Moreover, as viewed axially the first and second brakes 03, 04 are preferably arranged next to one another.

Figure 2:
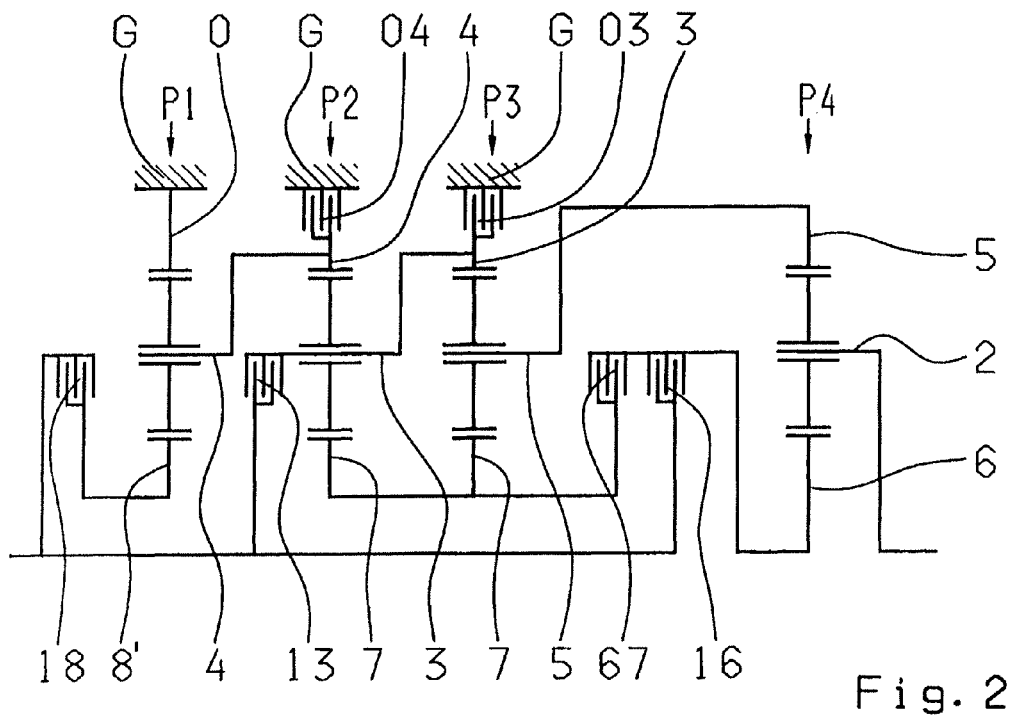
FIG. 2: A schematic view of a second preferred embodiment of a multi-speed transmission according to the invention.

In another embodiment of the invention which is the object of FIG. 2, the releasable connection of the carrier of the first planetary gearset P1 to the ring gear of the second planetary gearset P2 by way of the eighth shaft 8 connected to the carrier of the first planetary gearset P1 via the fourth clutch 48 which releasably connects the eighth shaft 8 to the fourth shaft 4 connected to the ring gear of the second planetary gearset P2, can be replaced by a direct connection by means of the fourth shaft 4, and in this case the direct connection of the drive input shaft 1 to the sun gear of the first planetary gearset P1 can be replaced by a releasable connection by means of a further clutch 18 which releasably connects the drive input shaft 1 to the further shaft 8' that is connected to the sun gear of the first planetary gearset P1.

FIG. 3 shows an example shifting scheme for a multi-speed transmission according to FIG. 1. For each gear, three shifting elements are engaged. From the shifting scheme, as examples, it is possible to see the respective gear ratios i of the individual gear steps and the gear intervals or step intervals phi up to the next-higher gear to be determined therefrom, so that the value 8.993 is the total ratio spread of the transmission.

Typical values for the fixed gear ratios of the planetary gearsets P1, P2, P3 and P4 designed as minus planetary gearsets are, respectively, −1.80, −3.554, −1.851 and −2.265. From FIG. 3 it can be seen that during a sequential shifting process double shifts or group shifts are avoided, since two adjacent gear steps use two shifting elements in common. It can also be seen that a large ratio spread is achieved with small gear intervals.

The first forward gear is obtained by engagement of the first brake 03 and the second and fourth clutches 16, 48, the second forward gear by engagement of the first and second brakes 03, 04 and the second clutch 16, the third forward gear by engagement of the first brake 03 and the second and third clutches 16, 67, the fourth forward gear by engagement of the second brake 04 and the second and third clutches 16, 67, the fifth forward gear by engagement of the second, third and fourth clutches 16, 67, 48, the sixth forward gear, preferably designed as a direct gear, by engagement of the first, second and third clutches 13, 16, 67, the seventh forward gear by engagement of the first, second and fourth clutches 13, 16 and 48, the eighth forward gear by engagement of the first, third and fourth clutches 13, 67, 48 and the ninth forward gear is obtained by engagement of the second brake 04 and the first and third clutches 13, 67, whereas the reverse gear is obtained by engagement of the first brake 03 and the third and fourth clutches 67, 48.

Since the first brake 03 and the fourth clutch 48 are engaged in both the first forward gear and the reverse gear, these shifting elements can be used as starting elements.

When the fourth clutch 48 has been omitted as in the example embodiment shown in FIG. 2, i.e. in the case when the releasable connection of the carrier of the first planetary gearset P1 and the ring gear of the second planetary gearset P2 by way of the eighth shaft 8, the fourth clutch 48 and the fourth shaft 4 has been replaced by a direct connection by means of the fourth shaft 4, in the shifting scheme the fourth clutch 48 is replaced by the further clutch 18 which, as shown in FIG. 2, releasably connects the drive input shaft 1 to the further shaft 8' connected to the sun gear of the first planetary gearset P1.

According to the invention, even with the same transmission scheme, depending on the shifting logic different gear intervals can be obtained, so that application-specific or vehicle-specific variation is possible.

According to the invention additional freewheels can be provided at any suitable place in the multi-speed transmission, for example between a shaft and the housing or if necessary to connect two shafts.

According to the invention, an axle differential and/or a transfer differential can be arranged on the input side or on the output side.

In an advantageous further development, the drive input shaft 1 can if necessary be separated from a drive motor by a clutch element, and as the clutch element a hydrodynamic converter, a hydraulic clutch, a dry starting clutch, a wet starting clutch, a magnetic powder clutch or a centrifugal force clutch can be used. It is also possible to arrange such a starting element in the force flow behind the transmission, and in that case the drive input shaft 1 is permanently connected to the crankshaft of the motor.

The multi-speed transmission according to the invention also enables a torsion oscillation damper to be arranged between the motor and the transmission.

In a further embodiment of the invention (not shown), a wear-free brake such as a hydraulic or electric retarder or the like can be arranged on any shaft, preferably on the drive input shaft 1 or the drive output shaft 2, this being particularly important for use in utility vehicles. Furthermore, a power take-off can be provided on any shaft for driving additional aggregates, preferably on the drive input shaft 1 or the drive output shaft 2.

The frictional shifting elements used can be in the form of shift-under-load clutches or brakes. In particular, frictional clutches or brakes such as disk clutches, band brakes and/or cone clutches can be used.

A further advantage of the multi-speed transmission described herein is that an electric machine can be fitted as a generator and/or as an additional drive machine on any shaft.

It goes without saying that any design configuration, in particular any spatial arrangement of the planetary gearsets and the shifting elements, in its own right and relative to one another and provided that it is technically appropriate, falls within the protective scope of the present claims, without influencing the function of the transmission as indicated in the claims, even if such configurations are not represented explicitly in the figures or the description.

Indexes

0 Shaft
1 First shaft, drive input shaft
2 Second shaft, drive output shaft
3 Third shaft
4 Fourth shaft
5 Fifth shaft
6 Sixth shaft
7 Seventh shaft
8 Eighth shaft
8' Further shaft
03 First brake
04 Second brake
13 First clutch
16 Second clutch
18 Further clutch
48 Fourth clutch
67 Third clutch
P1 First planetary gearset
P2 Second planetary gearset
P3 Third planetary gearset
P4 Fourth planetary gearset
i Gear ratio
phi Gear interval
G Housing

The invention claimed is:

1. A multi-ratio transmission of planetary design for a motor vehicle, the multi-ratio transmission comprising:
a drive input shaft (1) and a drive output shaft (2);
first, second, third and fourth planetary gearsets (P1, P2, P3, P4) arranged in a housing (G) of the transmission, each of the first planetary gearset (P1), the second planetary gearset (P2), the third planetary gearset (P3) and the fourth planetary gearset (P4) comprising a sun gear, a planet carrier and a ring gear;
third, fourth, fifth, sixth, seventh and eighth rotary shafts (3, 4, 5, 6, 7, 8, 8')
at least six shifting elements comprising first and second brakes (03, 04) and first, second, third and fourth clutches (13, 16, 18, 48, 67) and selective engagement the first brake (03), the second brake (04), the first clutch (13), the second clutch (16), the third clutch (67) and the fourth clutch (18, 48) results in various gear ratios between the drive input shaft (1) and the drive output shaft (2) such that first, second, third, fourth, fifth, sixth, seventh, eighth and ninth forward gears and one reverse gear can be implemented;
the sun gear of the first planetary gearset (P1) is functionally connected to the drive input shaft (1) and the drive input shaft (1) is connectable, via the first clutch (13), to the third shaft (3) and, via the second clutch (16), to the sixth shaft (6);
the third shaft (3) is coupled to the planet carrier of the second planetary gearset (P2) and the ring gear of the third planetary gearset (P3) and is connectable, via the first brake (03), to the housing (G) of the transmission;
the fourth shaft (4) is connectable, via the second brake (04), to the housing (G) of the transmission and is functionally connected to the ring gear of the second planetary gearset (P2) and the planet carrier of the first planetary gearset (P1);
the sixth shaft (6) is coupled to the sun gear of the fourth planetary gearset (P4) and is connectable, via the third clutch (67), to the seventh shaft (7);
the seventh shaft (7) is coupled to the sun gear of the third planetary gearset (P3) and the sun gear of the second planetary gearset (P2);
the ring gear of the first planetary gearset (P1) is fixedly connected to the housing (G) of the transmission;
the fifth shaft (5) is coupled to the planet carrier of the third planetary gearset (P3) and the ring gear of the fourth planetary gearset (P4); and
the drive output shaft (2) is coupled to the planet carrier of the fourth planetary gearset (P4).

2. The multi-ratio transmission according to claim 1, wherein
the sun gear of the first planetary gearset (P1) is directly connected to the drive input shaft (1);
the fourth shaft (4) is coupled to the ring gear of the second planetary gearset; and
the eighth shaft (8) is connected to the planet carrier of the first planetary gearset (P1), and the fourth clutch (48) releasably couples the eighth shaft (8) to the fourth shaft (4).

3. The multi-ratio transmission according to claim 1, wherein
the sun gear of the first planetary gearset (P1) is connectable to the drive input shaft (1) by the eighth shaft (8');
the eighth shaft (8') couples the sun gear of the first planetary gearset (P1) to the fourth clutch (18) and the fourth clutch (18) releasably couples the drive input shaft (1) to the eighth shaft (8'); and
the planet carrier of the first planetary gearset (P1) is directly connected, via the fourth shaft (4), to the ring gear of the second planetary gearset (P2).

4. The multi-ratio transmission according to claim 1, wherein the first planetary gearset (P1), the second planetary gearset (P2), the third planetary gearset (P3) and the fourth planetary gearset (P4) are minus planetary gearsets.

5. The multi-ratio transmission according to claim 2, wherein
the first forward gear results from engagement of the first brake (03), the second clutch (16) and the fourth clutch (48);
the second forward gear results from engagement of the first brake (03), the second brake (04) and the second clutch (16);
the third forward gear results from engagement of the first brake (03), the second clutch (16) and the third clutch (67);
the fourth forward gear results from engagement of the second brake (04), the second clutch (16) and the third clutch (67);
the fifth forward gear results from engagement of the second clutch (16), the third clutch (67) and the fourth clutch (48);

the sixth forward gear results from engagement of the first clutch (13), the second clutch (16) and the third clutch (67);

the seventh forward gear results from engagement of the first clutch (13), the second clutch (16) and the fourth clutch (48);

the eighth forward gear results from engagement of the first clutch (13), the third clutch (67) and the fourth clutch (48)

the ninth forward gear results from engagement of the second brake (04), the first clutch (13) and the third clutch (67); and the reverse gear results from engagement of the first brake (03), the third clutch (67) and the fourth clutch (48).

6. The multi-ratio transmission according to claim 3, wherein the first forward gear results from engagement of the first brake (03), the second clutch (16) and the fourth clutch (18);

the second forward gear results from engagement of the first brake (03), the second brake (04) and the second clutch (16);

the third forward gear results from engagement of the first brake (03), the second clutch (16) and the third clutch (67);

the fourth forward gear results from engagement of the second brake (04), the second clutch (16) and the third clutch (67);

the fifth forward gear results from engagement of the second clutch (16), the third clutch (67) and the fourth clutch (18);

the sixth forward gear results from engagement of the first clutch (13), the second clutch (16) and the third clutch (67);

the seventh forward gear results from engagement of the first clutch (13), the second clutch (16) and the fourth clutch (18);

the eighth forward gear results from engagement of the first clutch (13), the third clutch (67) and the fourth clutch (18)

the ninth forward gear results from engagement of the second brake (04), the first clutch (13) and the third clutch (67); and the reverse gear results from engagement of the first brake (03), the third clutch (67) and the fourth clutch (18).

* * * * *